United States Patent
Sun et al.

(10) Patent No.: US 10,511,903 B2
(45) Date of Patent: Dec. 17, 2019

(54) SOUND WAVE FILTERING STRUCTURE AND SIDE SOUND GENERATING SPEAKER MODULE

(71) Applicant: Goertek.Inc, Weifang, Shandong (CN)

(72) Inventors: Liguo Sun, Weifang (CN); Lianshan Ge, Weifang (CN)

(73) Assignee: Goertek.Inc, Weifang, Shandong (CN)

( * ) Notice: Subject to any disclaimer, the term of this patent is extended or adjusted under 35 U.S.C. 154(b) by 105 days.

(21) Appl. No.: 15/560,877

(22) PCT Filed: Dec. 14, 2015

(86) PCT No.: PCT/CN2015/097311
§ 371 (c)(1),
(2) Date: Sep. 22, 2017

(87) PCT Pub. No.: WO2016/150202
PCT Pub. Date: Sep. 29, 2016

(65) Prior Publication Data
US 2018/0124506 A1    May 3, 2018

(30) Foreign Application Priority Data
Mar. 23, 2015 (CN) .......................... 2015 1 0128229

(51) Int. Cl.
*H04R 1/28* (2006.01)
*H04R 1/34* (2006.01)

(52) U.S. Cl.
CPC ............ *H04R 1/2857* (2013.01); *H04R 1/345* (2013.01)

(58) Field of Classification Search
CPC ....... H04R 2499/11; H04R 5/02; H04M 1/035
(Continued)

(56) References Cited

U.S. PATENT DOCUMENTS

2013/0301863 A1* 11/2013 Weaver, III .......... H04R 1/2853
381/334

FOREIGN PATENT DOCUMENTS

CN          1398453 A     2/2003
CN        201398235 Y     2/2010
(Continued)

OTHER PUBLICATIONS

International Search Report and English Translation dated Feb. 23, 2016 in International Patent Application No. PCT/CN2015/097311.
(Continued)

*Primary Examiner* — George C Monikang
(74) *Attorney, Agent, or Firm* — Venable LLP; Michele V. Frank

(57) ABSTRACT

The present invention discloses a sound wave filtering structure. The sound wave filtering structure comprises a cavity wall, a cavity cover and a slit. The cavity cover is mounted on the cavity wall. The cavity wall and the cavity cover are combined to form an inner cavity. The slit is formed on the cavity wall and/or the cavity cover. The cavity wall and the cavity cover seal the inner cavity. A space in the inner cavity is communicated with the outside only through the slit. On the other hand, the present invention further provides a side sound generating speaker module. The side sound generating speaker module at least comprises a side sound generating cavity and the above-described sound wave filtering structure. The side sound generating cavity is configured to guide sound waves to be transmitted from a side surface of a single speaker body. The sound wave filtering structure is arranged on the side sound generating cavity. The slit faces the interior of the side sound generating cavity. The sound wave filtering structure provided by the present invention can adjust and filter high-frequency sound waves. Especially, in the side sound generating speaker
(Continued)

module, the sound wave filtering structure can significantly improve the sound quality of the high-frequency sound waves.

9 Claims, 9 Drawing Sheets

(58) Field of Classification Search
USPC ......... 381/71.5, 87, 332, 335, 336, 337, 338
See application file for complete search history.

(56) References Cited

FOREIGN PATENT DOCUMENTS

| CN | 104754487 A | 7/2015 |
|----|-------------|--------|
| CN | 204442697 U | 7/2015 |
| JP | S5765093 A  | 4/1982 |

OTHER PUBLICATIONS

Written Opinion dated Feb. 23, 2016 in International Patent Application No. PCT/CN2015/097311.

\* cited by examiner

SOUND WAVE FILTERING STRUCTURE AND SIDE SOUND GENERATING SPEAKER MODULE

CROSS-REFERENCE TO RELATED APPLICATIONS

This application is a National Stage of International Application No. PCT/CN2015/097311, filed on Dec. 14, 2015, which claims priority to Chinese Patent Application No. 201510128229.8, filed on Mar. 23, 2015, both of which are hereby incorporated by reference in their entireties.

FIELD OF THE INVENTION

The present invention relates to the design and manufacture of speaker structures, and more particularly, to a sound wave filtering structure in a speaker, and a speaker module.

BACKGROUND OF THE INVENTION

Mobile electronic devices have become indispensable daily necessities in modern life. With the development of the mobile electronic devices, people gradually put forward higher requirements on shapes, handheld comfort and the like of devices such as mobile phones and tablets. Taking a smart mobile phone as an example, in order to thin and beautify the mobile phone as much as possible, those skilled in the art try to regulate an original front sound generating speaker structure to a side sound generating speaker structure, so as to reduce a space occupied by the speaker structure in a thickness direction.

In a front sound generating speaker, a sound transmission direction is parallel to a vibration direction of a vibration diaphragm. While in a side sound generating speaker, a side sound generating cavity direction is perpendicular to a vibration direction of a vibration diaphragm, forcing the sound to be transmitted in a direction perpendicular to the vibration direction of the vibration diaphragm. However, as the sound propagation direction changes, a division point of high-frequency sound waves moves forward, resulting in a defect in the high-frequency sound waves of the side sound generating speaker. Due to the defect in the high-frequency sound waves, the overall sound quality of the side sound generating speaker is declined, so there is a large gap between the front sound generating speaker and the side sound generating speaker.

Therefore, in the technology of the side sound generating speaker, it is necessary to improve a front cavity of the speaker or the single speaker body, and to correct and adjust the defect in the high-frequency sound waves from aspects of propagation process and generation processes and the like of the sound waves, so as to improve the sound quality of the side sound generating speaker.

SUMMARY OF THE INVENTION

An object of the present invention is to provide a method or a structure for improving side sound generating sound quality of a speaker.

According to a first aspect of the present invention, there is provided a sound wave filtering structure, comprising: a cavity wall and a cavity cover, wherein the cavity cover is mounted on the cavity wall, and the cavity wall and the cavity cover are combined to form an inner cavity; and a slit formed on the cavity wall and/or the cavity cover, wherein the cavity wall and the cavity cover enclose the inner cavity, and a space in the inner cavity is communicated with the outside only through the slit.

An inner side of the inner cavity may be provided with an inner wall for changing a structure of the inner cavity. The inner wall may constitute a filtering channel. The cavity cover may also be provided with a flange corresponding to the inner wall.

Another object of the present invention is to provide a side sound generating speaker module having better sound quality, especially better treble sound quality.

According to a second aspect of the present invention, there is provided a side sound generating speaker module, comprising: a side sound generating cavity configured to guide sound waves to be transmitted from a side surface of a single speaker body; and the above-described sound wave filtering structure arranged on the side sound generating cavity, wherein the slit faces the interior of the side sound generating cavity.

The speaker module may comprise a first housing and a second housing, wherein the first housing is provided with a first sound generating channel and a speaker groove configured to mount the single speaker body, and the first sound generating channel is located on a side surface of the speaker groove; the second housing is mounted on the first housing, and is provided with a second sound generating channel corresponding to the first sound generating channel; and the first sound generating channel and the second sound generating channel are combined to form the side sound generating cavity.

The cavity wall may be formed on the first sound generating channel of the first housing; and the cavity cover is formed on the second sound generating channel of the second housing, and located at a position corresponding to the cavity wall.

The cavity wall may also be formed on the second sound generating channel of the second housing, and the cavity cover is mounted on the second housing.

The speaker module further comprises the single speaker body mounted in the speaker groove, and the second housing seals front surfaces of the speaker groove and the single speaker body. The single speaker body may comprise a magnetic circuit system and a vibration system.

The inventor of the present invention found that in the prior art, there is no technical means for improving the sound quality of a speaker by mounting a device, similar to the filtering structure, on a speaker module. Thus, the technical task to be achieved or the technical problem to be solved by the present invention has never been conceived or is not anticipated by a person skilled in the art, and the present invention relates to a new technical solution. In the side sound generating speaker module provided by the present invention, the side sound generating cavity guides sound waves to be propagated in a direction different from a vibration direction of the vibration system, especially in a vertical direction. When passing through the side sound generating cavity, the sound waves will pass through the sound wave filtering structure at a side or cross the same, so that high-frequency sound waves will be pressed into the slit due to an effect of its own propagation features. The sound wave filtering structure enables the high-frequency sound waves to be propagated and reflected therein, thereby absorbing and adjusting high-pitched sound waves and reducing harsh sounds. The filtered high-frequency sound waves are then transmitted from the slit, so that the sound quality can be significantly improved. On the other hand, due to side sound generating propagation features, when a certain segment of high-frequency sound waves is transmitted, the vibration system and the side sound generating cavity cannot make a sensitive response on the sound to be transmitted sooner in a short period of time. The sound wave filtering structure provided by the present invention enables resonant peaks of two adjacent sound waves to be closer, thereby attenuating a sound wave pause phenomenon.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the present invention and, together with the description thereof, serve to explain the principles of the present invention.

DETAILED DESCRIPTION OF THE EMBODIMENTS

Figure 1:
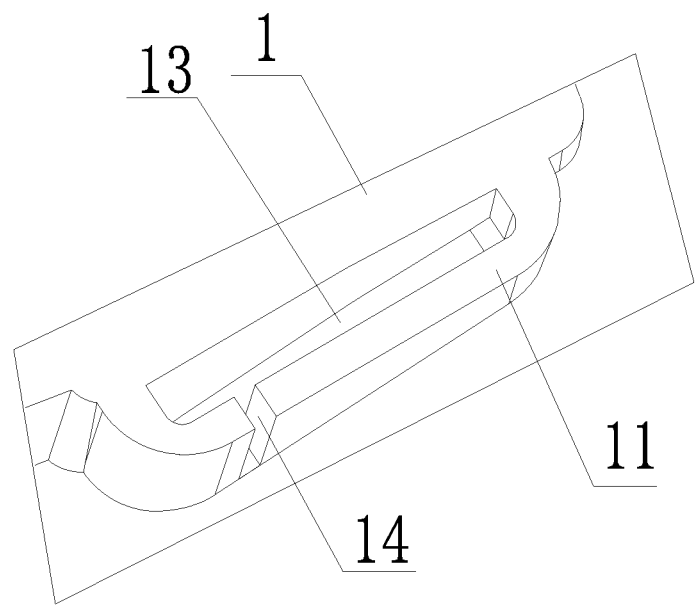
FIG. 1 is a schematically structural view of a cavity wall provided by a specific embodiment of the present invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed in the accompanying drawings.

The present invention provides a sound wave filtering structure 1 which may be configured to adjust and filter high-frequency sound waves so as to improve sound quality. The sound wave filtering structure 1 comprises a cavity wall 11 and a cavity cover 12. The inner side of the cavity wall 11 forms a part of space in a surrounding or half-surrounding manner. The cavity cover 12 is mounted on the cavity wall 11 to seal a part of an opening of the cavity wall 11; and the cavity wall 11 and the cavity cover 12 are combined to form an inner cavity 13. The cavity wall 11 may have a plurality of shapes or even separate structures. For example, the upper portion of the cavity wall 11 may be provided with an opening, and the cavity cover 12 is mounted on the cavity wall 11 to seal the opening; or the upper portion and the lower portion of the cavity wall 11 are provided with openings, respectively, and two cavity covers 12 seal the two openings of the cavity wall 11, respectively. In general, for facilitating processing, the cavity wall 11 is of an integral structure with a part of the opening. The present invention does not limit the structure of the cavity wall 11 or the cavity cover 12, and a person skilled in the art can design particular structures of the cavity wall and the cavity cover depending on the actual needs. The sound wave filtering structure 1 further comprises a slit 14 formed on the cavity wall 11 and/or the cavity cover 12, and the slit 14 is configured to communicate the inner cavity 13 with an external space. The inner cavity 13 formed by combining the cavity wall 11 and the cavity cover 12 adopts a semi-enclosed structure, joints of the cavity wall 11 and the cavity cover 12 are sealed portions, and the inner cavity 13 is communicated with the outside only through the slit 14. When the slit 14 is formed on the cavity wall 11 and the cavity cover 12, it should be ensured that after the cavity cover 12 is mounted on the cavity wall 11, a slit 14 at the cavity cover 12 portion can be accurately docked with a slit 14 at the cavity wall 11 portion to form a smooth slit 14. Generally, there is only one slit 14 in the sound wave filtering structure 1, and the slit 14 is narrow and thin in structure to achieve an effect of adjusting the high-frequency sound waves. However, the present invention does not limit particular features of the slit, and those skilled in the art can regulate the shape and the number of the slits according to an actual situation.

Figure 2:
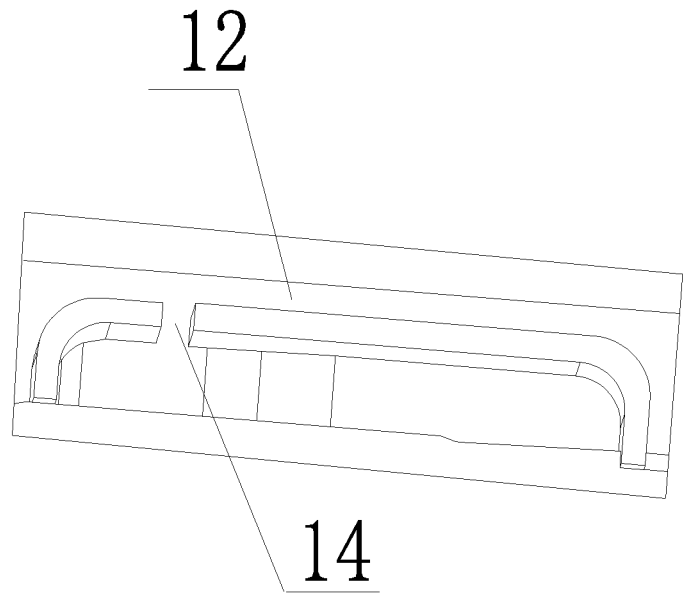
FIG. 2 is a schematically structural view of a cavity cover corresponding to the cavity wall in the embodiment of FIG. 1.

In a specific embodiment, as shown in FIG. 1, the cavity wall 11 of the sound wave filtering structure 1 is of an integral structure which forms a semi-enclosed space along its bottom surface and side surface. As shown in FIG. 2, the structure of the cavity cover 12 corresponds to that of the cavity wall 11. The cavity cover 12 is mounted on the cavity wall 11 to seal a top surface of the above space to form the inner cavity 13. Each of the cavity wall 11 and the cavity cover 12 is provided with a part of slit 14. When the cavity cover 12 is mounted on the cavity wall 11, the two parts of the slits 14 are docked to form a complete slit structure. When the sound waves pass through the sound wave filtering structure 1, the high-frequency sound waves will be pressed into the inner cavity from the slit 14 due to its own propagation characteristics. The high-frequency sound waves are reflected in the inner cavity 13, so that high-pitched sound can be weakened and adjusted, thereby improving the sound quality.

Figure 3:
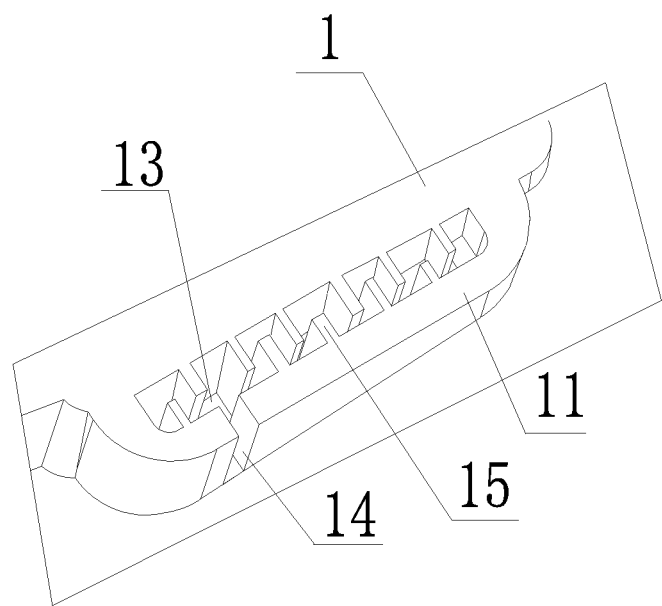
FIG. 3 is a schematically structural view of a cavity wall provided by a specific embodiment of the present invention.
Figure 4:
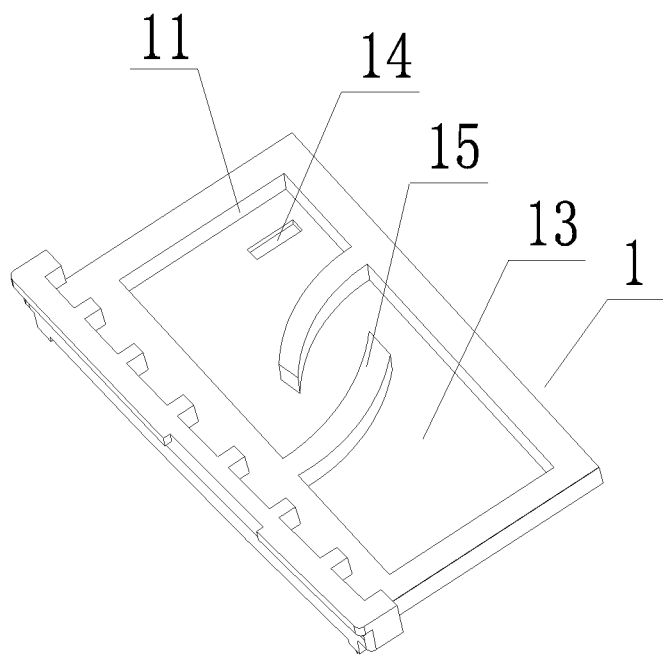
FIG. 4 is a schematically structural view of a cavity wall provided by a specific embodiment of the present invention.

Specially, due to differences in performance and structural features of various single speaker bodies and speaker modules, defects of produced high-frequency sound waves and sound waves are different. In order to adjust and correct sound waves with different frequencies, the inner cavity 13 may be provided with inner walls 15 configured to change the structure of the inner cavity 13. The inner walls 15 extend along the cavity wall 11 into the inner cavity 13 to divide the inner cavity 13 into a special spatial structure to allow the sound waves to be propagated and reflected in the inner cavity 13, achieving the adjusting effect. In one embodiment, as shown in FIG. 3, the inner walls 15 are distributed on two opposite planes of the cavity wall 11 at a certain interval and extend towards the inner cavity 13. The inner walls 15 shown in FIG. 3 constitute a curved extension filtering channel which lengthens a propagation distance of the sound waves in the inner cavity 13. After entering the interior of the inner cavity 13 from the slit 14, the sound waves are reflected repeatedly, and are transmitted along the filtering channel. In another embodiment, as shown in FIG. 4, the inner walls 15 divide the inner cavity 13 into a structure having a larger space on both sides and a narrow channel in the middle. Those skilled in the art can design the structural distribution of the inner walls 15 according to the actual needs of sound wave processing to form a filtering channel or a specific cavity body. The present invention does not limit the distribution structure of the inner walls 15.

Figure 5:
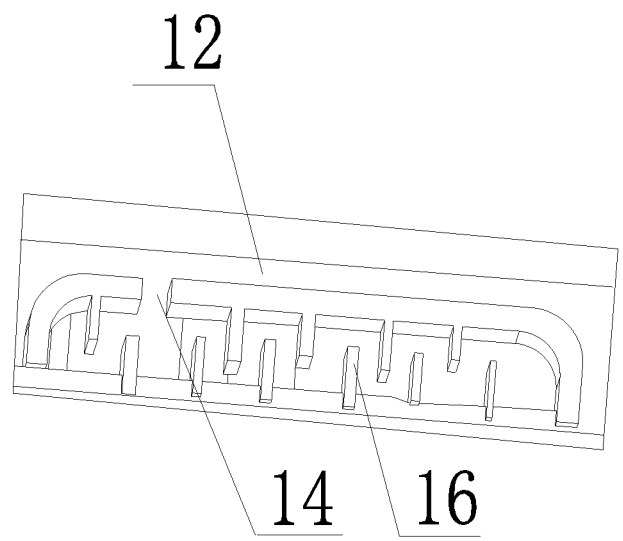
FIG. 5 is a schematically structural view of a cavity cover corresponding to the cavity wall in the embodiment of FIG. 3.

In addition, as shown in FIG. 5, when the cavity wall 11 is provided with the inner walls 15, the cavity cover 12 may be provided with flanges 16 corresponding to the inner walls 15. When the cavity cover 12 is mounted on the cavity wall 11, the flanges 16 can be docked with the inner walls 15 in a matched manner; and the flanges and the inner walls 15 together form a filtering channel or other structures in the inner cavity 13.

The sound wave filtering structure provided by the present invention can adjust the high-frequency sound waves to eliminate high-pitched sound in the sound waves, thereby improving the sound quality of the speaker. Especially, when the speaker structure employs a side sound generating manner, the sound wave filtering structure can significantly improve the sound quality of the speaker with respect to high-frequency sound.

Further, the present invention also provides a side sound generating speaker module 2. The side sound generating speaker module at least comprises a side sound generating cavity 23 and the above-described sound wave filtering structure 1. The side sound generating cavity 23 is configured to guide sound emitted from a single speaker body to be transmitted from its own side surface. The sound wave filtering structure 1 is arranged on the side sound generating cavity 23; and the sound wave emitted from the single speaker body can pass through the sound wave filtering structure 1 when it is transmitted into the side sound generating cavity 23. The slit 14 should face the interior of the side sound generating cavity 23, so that the high-frequency sound wave can enter the inner cavity 13 from the slit 14 when passing through the sound wave filtering structure 1.

Figure 6:
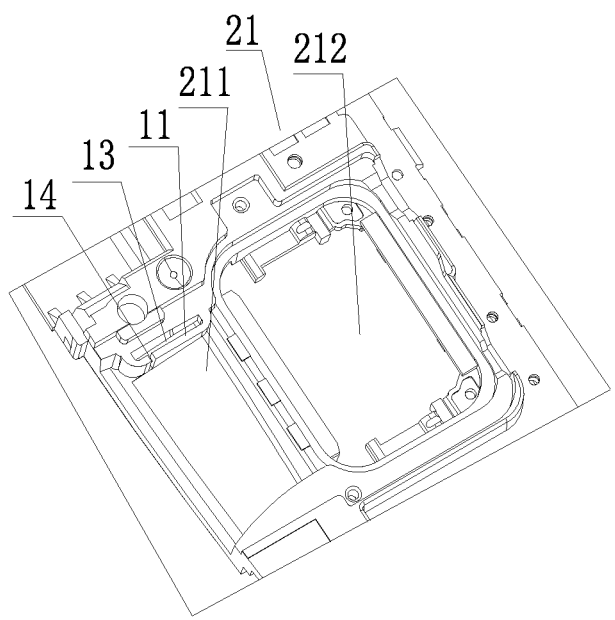
FIG. 6 is a schematically structural view of a first housing provided by a specific embodiment of the present invention.
Figure 7:
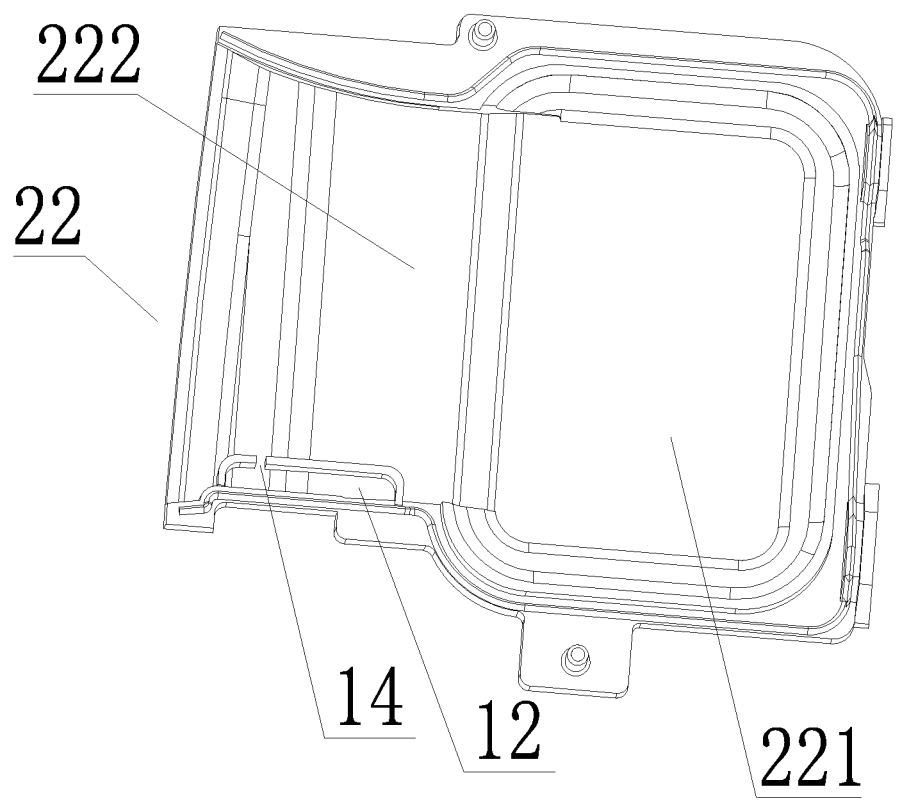
FIG. 7 is a schematically structural view of a second housing corresponding to the first housing in the embodiment of FIG. 6.

In particular, the speaker module 2 may comprise a first housing 21 and a second housing 22. As shown in FIG. 6, the first housing 21 is provided with a first sound generating channel 211 and a speaker groove 212 configured to mount the single speaker body, wherein the first sound generating channel 211 is located on the side surface of the speaker groove 212. When the single speaker body is mounted on the speaker groove 212, a vibration direction of a vibration diaphragm of the speaker should be different from or perpendicular to an extending direction of the first sound generating channel 211. In the present invention, the side sound generating means a sound generating manner in which sound waves are transmitted from the speaker module in a direction different from, even perpendicular to, the vibration direction of the vibration diaphragm of the speaker. Generally, the sound waves propagated in a side sound generating manner are transmitted from the side surfaces of the single speaker body and the speaker groove 212. The first sound generating channel 211 is a part of the side sound generating cavity, and is capable of guiding the sound emitted from the single speaker body to be propagated in a direction different from the vibration direction of the vibration diaphragm. As shown in FIG. 7, the second housing 22 is provided with a front cover portion 221 and a second sound generating channel 222. The second housing 22 is mounted on the first housing 21, and the front cover portion 221 seals the front surface of the speaker groove 212. The second housing 22 is provided with the second sound generating channel 222 corresponding to the first sound generating channel 211. When the second housing 22 is mounted on the first housing 21, the second sound generating channel 222 can be combined with the first sound generating channel 211 to form the side sound generating cavity. Since the front cover portion 221 of the second housing 22 seals the front surfaces of the speaker groove 212 and of the single speaker body, sound emitted from the single speaker body cannot be transmitted from the front surface. The sound wave is propagated towards the side surface along the space defined by the first housing 21 and the second housing 22, then enters the side sound generating cavity on the side surface of the speaker groove 212, and finally is transmitted from the side surface of the speaker module.

In one embodiment, as shown in FIG. 6, the cavity wall 11 of the sound wave filtering structure is located on the first housing 21 and is arranged in the first sound generating channel 211. Preferably, the cavity wall 11 is arranged on the side wall of the first sound generating channel 211 to avoid the reduction of the space in the first sound generating channel 211. The cavity wall 11 forms a certain space on the side wall of the first sound generating channel 211 in a surrounding manner; and an opening is formed in the top of the cavity wall 11. The slit 14 communicates a space inside the cavity wall 11 with the first sound generating channel 211. The inner side of the cavity wall 11 may also be provided with inner walls configured to divide the space surrounded therein into a specific spatial structure. As shown in FIG. 7, the cavity cover 12 of the sound wave filtering structure is located on the second housing 22 and is arranged in the second sound generating channel 222. The position where the cavity cover 12 is located on the second housing 22 should be ensured that when the second housing 22 is mounted on the first housing 21, the cavity cover 12 can be well docked with the cavity wall 11. The cavity cover 12 seals the top of the cavity wall 11, and is combined with the cavity wall 11 to form an inner cavity 13. The cavity cover 12 may also be provided with a part of the slit 14; after the cavity cover 12 and the cavity wall 11 are docked, slits 14 thereon can be docked to form a complete slit 14. The first housing 21 and the second housing 22 are jointed in a sealed manner through gelatinizing, welding or the like. After the cavity cover 12 and the cavity wall 11 are sealed, the inner cavity 13 is communicated with the side sound generating cavity and the external space only through the slit 14.

Figure 8:
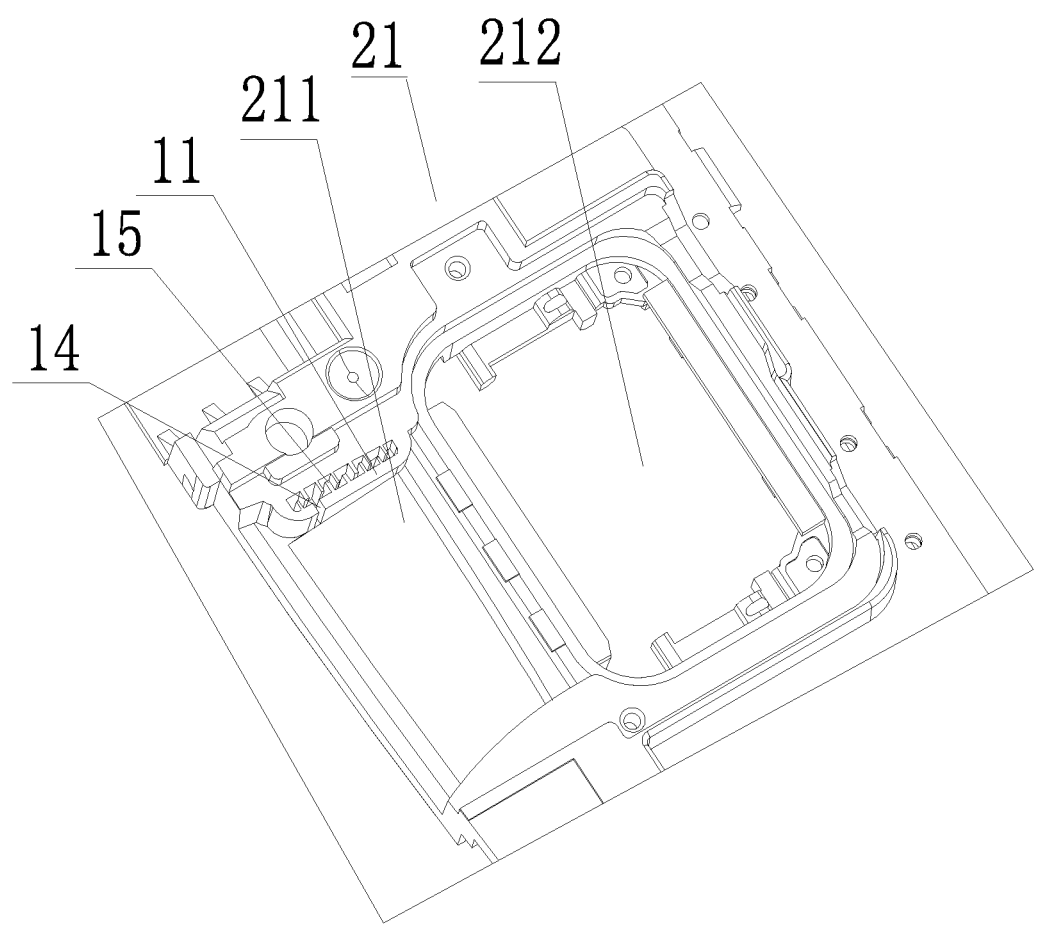
FIG. 8 is a schematically structural view of a first housing provided by a specific embodiment of the present invention.
Figure 9:
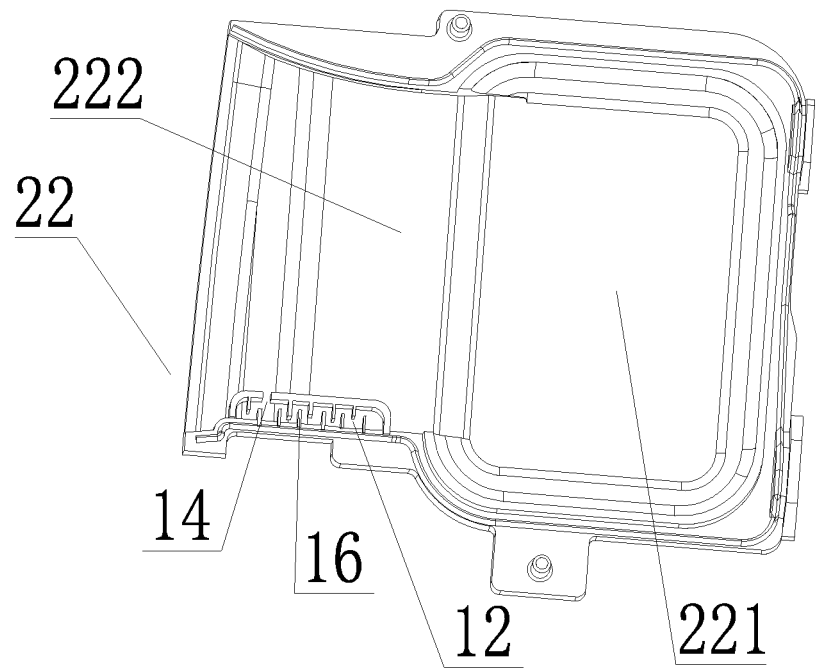
FIG. 9 is a schematically structural view of a second housing corresponding to the first housing in the embodiment of FIG. 8.

Specially, as shown in FIGS. 8 and 9, when the cavity wall 11 is provided with inner walls 15, the cavity cover 12 may also be provided with flanges 16 corresponding to the inner walls 15. When the second housing 22 is jointed with the first housing 21 in a sealed manner, the flanges 16 are also jointed with the inner walls 15 in a sealed manner. The flanges 16 cooperate with the inner walls to divide the inner cavity 13 into a specific spatial structure.

Figure 10:
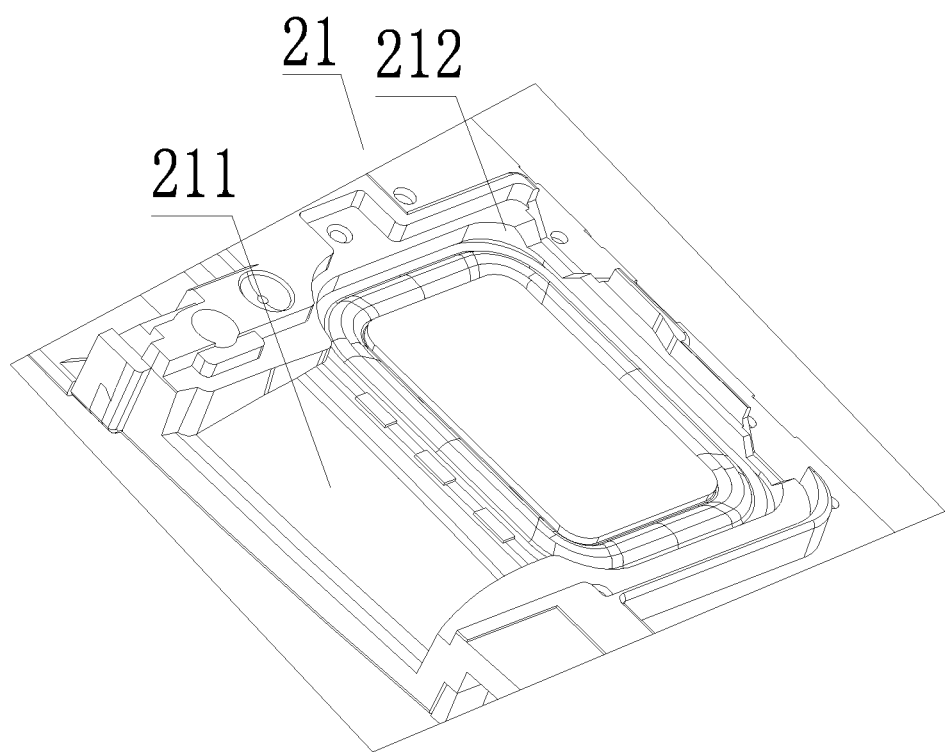
FIG. 10 is a schematically structural view of a first housing provided by a specific embodiment of the present invention.
Figure 11:
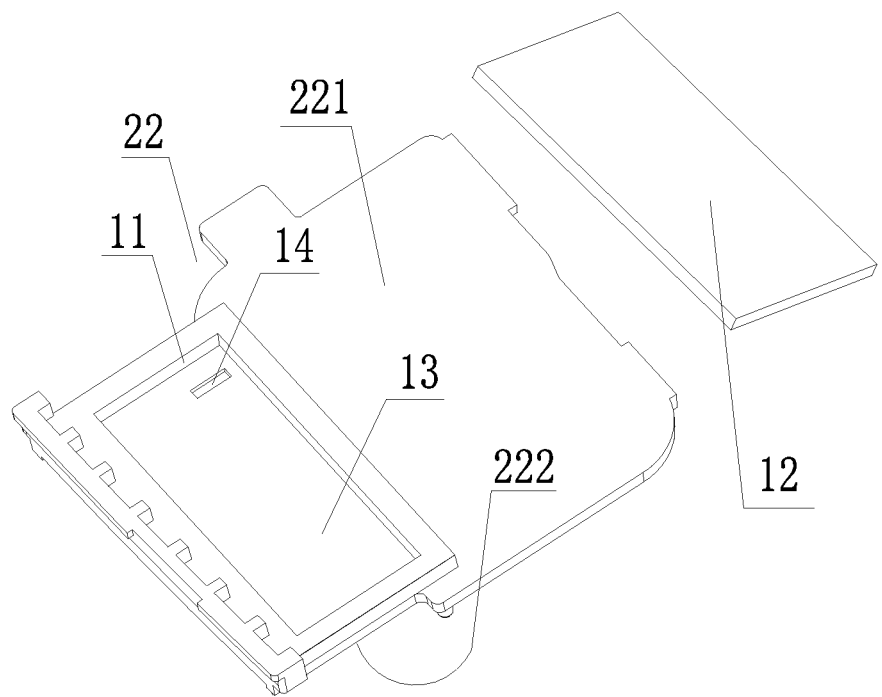
FIG. 11 is a schematically structural view of a second housing corresponding to the first housing in the embodiment of FIG. 10.
Figure 12:
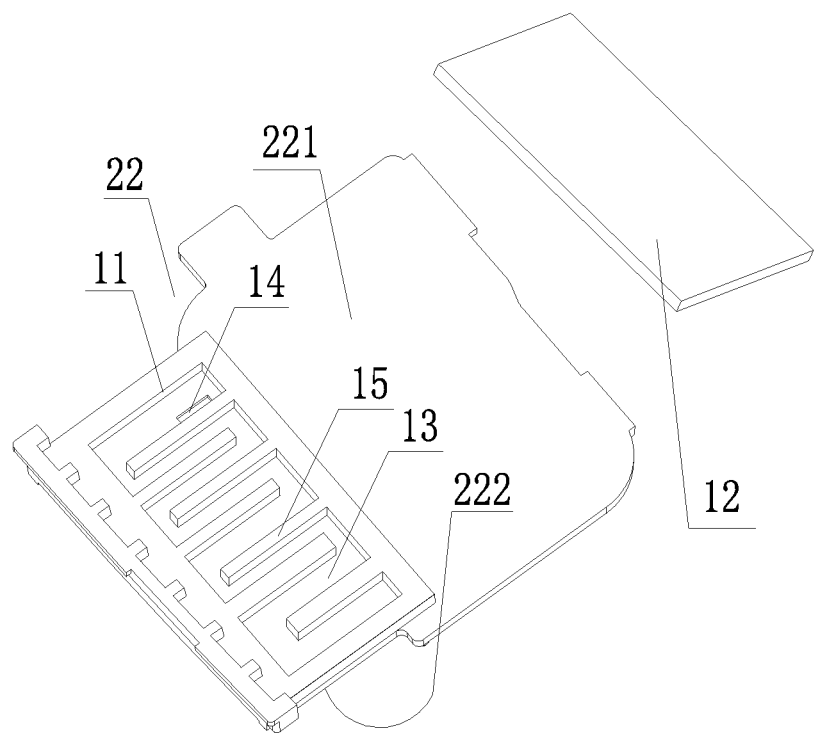
FIG. 12 is a schematically structural view of a second housing corresponding to the first housing in the embodiment of FIG. 10.
Figure 13:
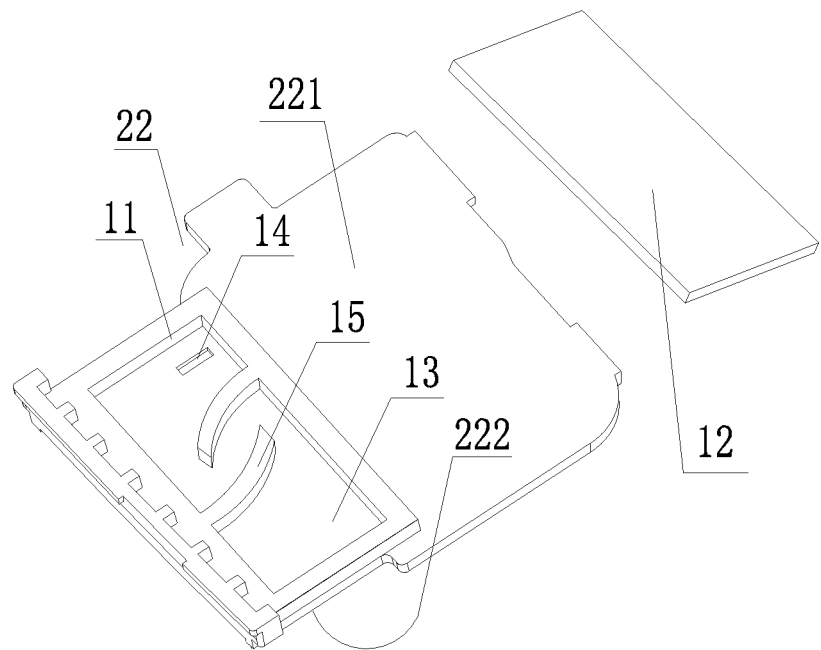
FIG. 13 is a schematically structural view of a second housing corresponding to the first housing in the embodiment of FIG. 10.

In another embodiment, as shown in FIGS. 10 and 11, the cavity wall 11 of the sound wave filtering structure is located on the second housing 22. Preferably, the cavity wall 11 is located at the top of the second sound generating channel 222. After the second housing 22 is mounted on the first housing 21, the cavity wall 11 should be located at the top of the side sound generating cavity. Preferably, in order not to reduce the space of the side sound generating cavity, the cavity wall 11 forms a space on the upper surface of the second housing 22 in a half-surrounding manner to define the bottom and side surfaces of the space. The slit 14 is formed on the bottom surface of the space, namely, on the bottom surface of the cavity wall 11. The slit 14 communicates the space formed by the cavity wall 11 in a half-surrounding manner with the second sound generating channel 222 located below the second housing 22. The second housing 22 is mounted on the first housing 21, and the second sound generating channel 222 is combined with the first sound generating channel 211 to form the side sound generating cavity. The cavity cover 12 is mounted on the second housing 22 to seal the top surface of the space, and is combined with the cavity wall 11 to form an inner cavity 13. The cavity cover 12 and the second housing 22 are jointed in a sealed manner, and the inner cavity 13 is communicated with the side sound generating cavity only through the slit 14. The inner side of the cavity wall 11 may also be provided with inner walls 15; and the inner walls 15 extend along the cavity wall 11 into the inner cavity 13 to divide the inner cavity 13 into a specific spatial structure. As shown in FIG. 12, the inner walls 15 may divide the inner cavity 13 into a curved filtering channel. As shown in FIG. 13, the inner walls may divide the inner cavity 13 into a spatial structure having two wider ends and a narrow channel in the middle.

Specially, when the sound wave filtering structure is provided with inner walls, flanges corresponding to the inner walls may also be arranged on the cavity cover. When the cavity cover is mounted on the second housing, the flanges can be docked with the inner walls in a sealed manner; and the inner walls and the flanges are combined to divide the inner cavity into a specific spatial structure.

Figure 14:
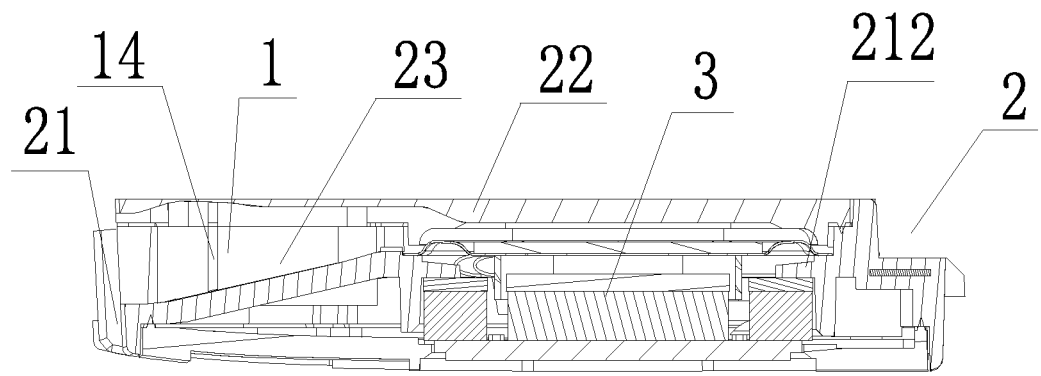
FIG. 14 is a side sectional view of a side sound generating speaker module formed by combining the first housing and the second housing in the embodiments of FIGS. 6-9.
Figure 15:
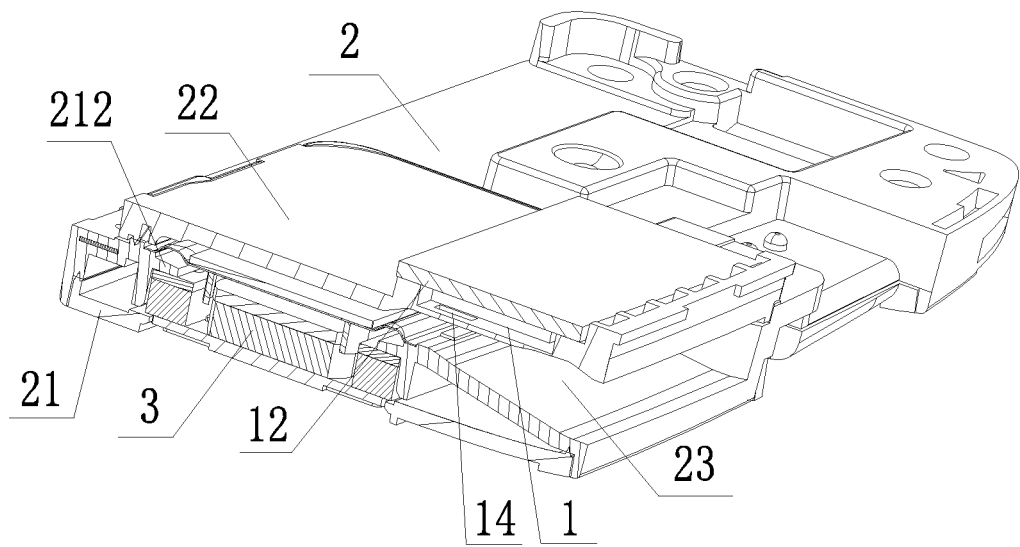
FIG. 15 is a side sectional view of a side sound generating speaker module formed by combining the first housing and the second housing in the embodiment of FIG. 10 and FIG. 12.

In addition, the side sound generating speaker module 2 further comprises the single speaker body 3 mounted in the speaker groove 212. In the embodiment shown in FIG. 14, the sound wave filtering structure 1 and the speaker groove 212 are arranged on the first housing 21, and the first sound generating channel is located next to the speaker groove 212. After the single speaker body is mounted in the speaker groove 212, the first sound generating channel is capable of providing a sound generating space for the single speaker body. When the second housing 22 is mounted on the first housing 21, the front cover portion 221 seals the front surface of the single speaker body, so that the single speaker body cannot transmit sound waves from the front surface to the outside of the module. However, the side sound generating cavity 23 formed by the first sound generating channel and the second sound generating channel 222 provides a space on the side surface of the single speaker body, allowing the sound waves to be transmitted along the side surface of the module. When being propagated in the side sound generating cavity 23, the sound waves will pass through the sound wave filtering structure 1, so that high-frequency sound waves can be adjusted. In an implementation described in FIG. 15, the sound wave filtering structure 1 is arranged on the second housing 22, and the speaker groove 212 is formed on the first housing 21. Likewise, the first sound generating channel is also located next to the speaker groove 212. When the second housing 22 is mounted on the first housing 21, the combined side sound generating cavity 23 provides a sound generating space on the side surface of the single speaker body. The sound wave filtering structure 1 is located at the top of the side sound generating cavity 23. The slit 14 faces the interior of the side sound generating cavity 23.

Figure 16:
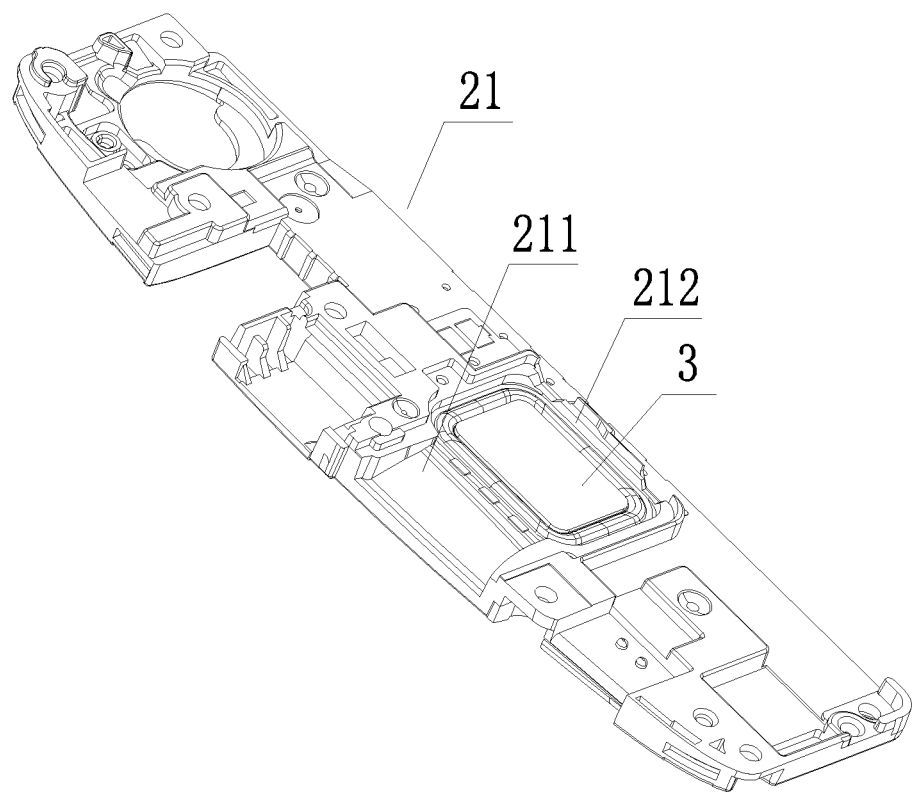
FIG. 16 is a schematically structural view showing the overall structure of the first housing in the embodiment of FIG. 10.

The single speaker body may comprise a magnetic circuit system and a vibration system. The magnetic circuit system may comprise a washer, a magnet and a basin frame. The vibration system may comprise a voice coil, a vibration diaphragm and a composite layer. FIG. 16 shows an overall schematic view of the first housing 21 in the embodiment described in FIGS. 10 and 11. As shown in FIG. 16, the speaker groove 212 is formed on the first housing 21; the magnetic circuit system is mounted into the speaker groove 212 from the bottom of the first housing 21; and the vibration system is mounted into the speaker groove 212 from the top of the first housing 21. The second housing is mounted above the speaker groove 212 and the first sound generating channel. A position of the speaker groove 212 and a mounting manner of the single speaker body can be selected by a person skilled in the art according to an actual situation.

The above description relates to particular implementations of the sound wave filtering structure 1 and the side sound generating speaker module 2 provided by the present invention. The present invention is not limited to the only above-described embodiments, and those skilled in the art can regulate the factors such as the shape of the cavity wall 11, the structural features in the inner cavity 13, the position of the sound wave filtering structure 1 in the side sound generating cavity 23, and the like according to actual use requirements, a production process and the like. For the sound wave filtering structure 1 provided by the present invention, the cavity wall 11 and the cavity cover 12 should form a semi-enclosed inner cavity 13 which communicates with the outside only through a narrow slit 14. Different single speaker bodies and different module structures can cause adjustment requirements of the sound waves to be different; and those skilled in the art can use the inner walls 15 to divide the inner cavity 13 into a desired spatial structure according to structural characteristics of the side sound generating module and sound generating characteristics of the single speaker body. After being docked, the cavity wall 11 and the cavity cover 12 should be sealed by means of gelatinizing, welding or the like. For the side sound generating module provided by the present invention, the front surfaces of the speaker groove 212 and the single speaker body should be sealed, and the side sound generating cavity 23 should be formed on the side surface of the single speaker body to guide the sound waves to be transmitted from the side surface. The sound wave filtering structure 1 is located within the side sound generating cavity 23. It should be ensured that the side sound generating cavity 23 does not occupy excessive space in the side sound generating cavity 23. The cavity wall 11 and the cavity cover 12 may be formed on different housings, respectively, or may be separately formed and mounted on a housing.

The above examples are only intended to be illustrative but not to limit the scope of the present invention. It should be understood by those skilled in the art that the above embodiments can be modified without departing from the scope and spirit of the present invention. The scope of the present invention is defined by the appended claims.

What is claimed is:

1. A sound wave filtering structure arranged on a side sound generating cavity of a side sound generating speaker module, comprising:
    a cavity wall and a cavity cover, wherein the cavity cover is mounted on the cavity wall, and the cavity wall and the cavity cover are combined to form an inner cavity; and
    a slit formed on the cavity wall and/or the cavity cover, the slit facing the interior of the side sound generating cavity;
    wherein the cavity wall and the cavity cover enclose the inner cavity, and a space in the inner cavity is communicated with the side sound generating cavity only through the slit.

2. The sound wave filtering structure of claim 1, wherein the inner side of the cavity wall is provided with an inner wall configured to extend along the cavity wall into the inner cavity to divide the inner cavity into a spatial structure that enables sound waves to be propagated and reflected in the inner cavity.

3. The sound wave filtering structure of claim 2, wherein the inner wall constitutes a filtering channel.

4. The sound wave filtering structure of claim 2, wherein the cavity cover is provided with a flange jointed with the inner wall in a sealed manner, and the flange cooperates with the inner wall to divide the inner cavity into a spatial structure that enables sound waves to be propagated and reflected in the inner cavity.

5. A side sound generating speaker module, comprising:
    a single speaker body, comprising a magnetic circuit system and a vibration system,
    a side sound generating cavity configured to guide sound waves to be transmitted from a side surface of the single speaker body; and
    the sound wave filtering structure of claim 1.

6. The speaker module of claim 5, comprising: a first housing and a second housing, wherein
    the first housing is provided with a first sound generating channel and a speaker groove configured to mount the single speaker body, and the first sound generating channel is located on a side surface of the speaker groove;
    the second housing is mounted on the first housing, and the second housing is provided with a second sound generating channel corresponding to the first sound generating channel; and
    the first sound generating channel is combined with the second sound generating channel to form the side sound generating cavity.

7. The speaker module of claim 6, wherein the cavity wall is formed on a first sound generating channel of the first housing, and the cavity cover is formed on a second sound generating channel of the second housing and located at a position corresponding to the cavity wall.

8. The speaker module of claim 6, wherein the cavity wall is formed on the second sound generating channel of the second housing, and the cavity cover is mounted on the second housing.

9. The speaker module of claim 6, wherein the speaker module comprises the single speaker body; the single speaker body is mounted in the speaker groove; and the second housing seals the front surfaces of the speaker groove and the single speaker body.

* * * * *